United States Patent
Zanzig et al.

(10) Patent No.: US 7,255,762 B2
(45) Date of Patent: Aug. 14, 2007

(54) CAMOUFLAGE TIRE

(75) Inventors: David John Zanzig, Bertrange (LU); David Andrew Benko, Munroe Falls, OH (US); James Joseph Nespo, Mogadore, OH (US); Terry John Waibel, Wadsworth, OH (US); Michael Julian Crawford, Akron, OH (US); Timothy Michael Rooney, Munroe Falls, OH (US); Bina Patel Botts, Stow, OH (US); George Frank Balogh, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 232 days.

(21) Appl. No.: 10/374,225

(22) Filed: Feb. 25, 2003

(65) Prior Publication Data

US 2004/0020575 A1   Feb. 5, 2004

Related U.S. Application Data

(60) Provisional application No. 60/359,533, filed on Feb. 25, 2002.

(51) Int. Cl.
*B29D 30/72*   (2006.01)
*B60C 13/00*   (2006.01)

(52) U.S. Cl. .................. 156/116; 152/525; 427/393.5; 427/407.1

(58) Field of Classification Search ................ 156/116; 152/524, 525; 427/407.1, 413, 393.5; 428/919; 114/15
See application file for complete search history.

(56) References Cited

U.S. PATENT DOCUMENTS

| | | | | |
|---|---|---|---|---|
| 1,305,296 A | * | 6/1919 | Mackay | 114/15 |
| 1,784,118 A | * | 12/1930 | Smithers | 152/523 |
| 1,989,703 A | | 2/1935 | Leguillon | 18/61 |
| 2,088,561 A | * | 7/1937 | Bagley et al. | 152/524 |
| 3,979,547 A | * | 9/1976 | Roberts et al. | 152/525 |
| 4,243,709 A | | 1/1981 | Morton | 428/195 |
| 4,722,380 A | * | 2/1988 | Botzman | 152/525 |
| D297,596 S | * | 9/1988 | Marquart, Sr. | D5/62 |
| D301,289 S | * | 5/1989 | McIlhinney | D5/62 |
| 4,865,900 A | * | 9/1989 | Shannon et al. | 428/195.1 |
| 5,077,101 A | * | 12/1991 | Conway et al. | 428/17 |
| 5,549,938 A | * | 8/1996 | Nesbitt | 428/17 |
| 6,062,283 A | * | 5/2000 | Watanabe et al. | 152/510 |
| 6,133,373 A | * | 10/2000 | Kirochko et al. | 524/805 |
| 2003/0140999 A1 | | 7/2003 | Smith et al. | 152/524 |
| 2003/0152790 A1 | | 8/2003 | Halladay et al. | 428/500 |

FOREIGN PATENT DOCUMENTS

| | | | |
|---|---|---|---|
| DE | 19630586 A1 | * | 2/1998 |
| EP | 1 266 771 A1 | | 12/2002 |
| WO | WO 02/26857 | | 4/2002 |

OTHER PUBLICATIONS

Machine translation for DE 19630586, Feb. 5, 1998.*
European Search Report dated Jun. 14, 2004.

* cited by examiner

*Primary Examiner*—Geoffrey L. Knable
(74) *Attorney, Agent, or Firm*—John D. DeLong

(57) ABSTRACT

The present invention is directed to a camouflage tire suitable for use in various vehicle use environments wherein it is desirable to reduce or eliminate a viewer's visual perception of the tire against the given environmental background.

9 Claims, No Drawings

CAMOUFLAGE TIRE

This application claims the benefit of provisional application Ser. No. 60/359,533, filed Feb. 25, 2002.

The present invention is directed to a camouflage tire suitable for use in various vehicle use environments wherein it is desirable to reduce or eliminate a viewer's visual perception of the tire against the given environmental background.

BACKGROUND OF THE INVENTION

Vehicles for military and recreational use often are camouflaged to reduce the ability of a viewer to perceive the vehicle in a given environment. For example, military trucks are often colored in suitable camouflage patterns having various areas of green, brown, tan, black, etc. that are arranged to allow the vehicle to blend in with a forested or mountainous environment. Alternatively, the vehicle may be colored white to blend in with a snowy or arctic type environment, or the vehicle may be colored tan, brown, or various shades of pink to blend in with a desert or grassland environment. The particular shades of colors used and the camouflage pattern depend on the vehicle use environment.

While camouflage of vehicle parts such as the body panels is routine, camouflage of tires has not been successfully accomplished. The use of a typically black tire on an otherwise camouflaged vehicle may leave the vehicle susceptible to visual detection, due to the contrast of the black tires with the environmental background. It would, therefore, be desirable to have a tire camouflaged with a suitable color and/or pattern that will reduce or eliminate the visual perceptibility of the tire when mounted on a vehicle in a given environment.

SUMMARY OF THE INVENTION

The present invention provides a camouflaged tire, wherein the tire comprises a surface pattern such that the visual perceptibility of the tire against a given environmental background is reduced as compared to a standard, black tire.

In one embodiment, the camouflaged tire comprises a multicolored pattern suitable for use in a forest or mountainous region or the like.

In another embodiment, the camouflaged tire comprises a monochromatic pattern suitable for use in a snowy or arctic region or the like.

In yet another embodiment, the camouflaged tire comprises a monochromatic pattern suitable for use in a desert or grassland region or the like.

The camouflage tire may comprise a flexible, elastomeric coating applied to a cured tire. The coating may comprise one or more colorants to provide the camouflage tire with the desired camouflage pattern. The coating may be applied to the tire in one or more layers to provide one or more areas of color on the surface of the camouflage tire, resulting in a suitable camouflage pattern usable in a given environment.

DETAILED DESCRIPTION OF THE INVENTION

The camouflage tire comprises a tire having at least one external surface, and a coating applied to the at least one external surface. The coating may include colorants to give the camouflage tire a suitable appearance and function such that the camouflage tire will have a reduced visual perceptibility when viewed against the background of a given environment.

The camouflage tire may comprise any vehicle tire as is known in the art. In one embodiment, the camouflage tire may comprise an all terrain vehicle (hereinafter referred to as ATV) type tire suitable for use on an ATV type recreational vehicle such as the Sportsman 500 and Sportsman 6×6 made by Polaris and the like, and ATVs made by Yamaha and the like. In another embodiment, the camouflage tire may comprise a truck or jeep tire suitable for use on commercial or military trucks, Jeep® type vehicles, Hummer® type vehicles, or other vehicles such as sport utility vehicles (hereinafter referred to as SUV), pickup trucks, off road earth moving vehicles and the like. Any tire usable in a manner in which the user desires a reduced visual perceptibility of the tire against a given environmental background may be used in the camouflage tire.

The camouflage tire may further comprise a coating applied to at least one external surface of the tire. A coating may be applied to any or all external tire surfaces, including the bead, sidewall, and tread surfaces of the tire. In one embodiment, the coating is applied co-extensively over the entire external surface of the tire.

The coating applied to the tire external surfaces may be any suitable coating material that will adequately adhere to the tire surface and suitably resist peeling, cracking, and sloughing from the tire. In one embodiment, the coating is a liquid solution of at least one elastomer in a water or solvent-based carrier.

In one alternative embodiment, the coating may be applied as a water-based elastomer liquid. The elastomer may be dispersed as finely divided polymer particles in the water-based carrier as an emulsion or latex comprising various suitable additives including surfactants, preservatives, and colorants. Other additives may be included in the water-based elastomer liquid as are known in the art. The water-based elastomer may be used as a one part coating application or as part of a two-part application. In one embodiment, the water-based elastomer may be used as a one-part coating wherein suitable curing agents are included to promote crosslinking or otherwise cure the elastomer coating. In another embodiment, the water-based elastomer may be used a part of a two part application, wherein suitable curing agents are contained separate from the water-based elastomer, and mixed with the water-based elastomer immediately prior to application on the tire external surface.

In another embodiment, the coating may be applied as a solvent-based liquid. The elastomer may be partially or completely dissolved or swelled in a suitable organic solvent. Suitable solvents include but are not limited to various organic solvents as are known in the art such as cyclohexane, hexane, heptane, octane, decane, dodecane, methylene chloride, chloroform, and the like; and various aromatic solvents such as toluene and the like; halogenated aromatics, various Tolusols generally containing $C_7$ hydrocarbons and significant amounts of aromatic compounds therein, xylene, dichlorobenzene, and the like; diphenyl ether, and the like; ketones including acetone, methyl ethyl ketone, methyl isobutyl ketone, and the like; and alkyl esters such as ethyl acetate, methyl acetate and the like. Solvents may be used singly or as a mixture of one or more solvents. The solvent-based elastomer liquid may be used as a one part coating application or as part of a two-part application. In one embodiment, the solvent-based elastomer may be used as a one-part coating wherein suitable curing agents are included to promote crosslinking or otherwise cure the elastomer coating. In another embodiment, the solvent-based elastomer may be used a part of a two part application, wherein suitable curing agents are contained separate from the solvent-based elastomer, and mixed with the solvent-based elastomer immediately prior to application on the tire external surface.

One suitable solvent-based elastomer is available commercially under the name EnduraLast from the Lord Corporation. This material may be modified through the addition of suitable colorants to obtain the colors desirable in a camouflage pattern on a tire.

The elastomer usable in either a water-based or solvent-based coating may be any suitable elastomer that will form a uniform coating on the external surface of the tire and will resist cracking, peeling or sloughing from the surface. In one embodiment, the elastomer may comprise one or more crosslinkable thermoplastic elastomers as are known in the art including natural or synthetic rubber, halogenated rubbers, polyurethanes, polyacrylics, polyacrylates, chloropolymers, fluoropolymers, and the like. The elastomer may alternatively comprise EPDM, silicone rubber, polychloroprene, epichlorohydrin, acrylonitrile rubber, hydrogenated acrylonitrile rubber, zinc salts of unsaturated carboxylic acid ester grafted hydrogenated nitrile butadiene elastomer, natural rubber, synthetic polyisoprene, styrene-butadiene rubber, 1,4-trans-polybutadiene, ethylene-vinyl-acetate copolymer, ethylene methacrylate copolymers and terpolymers, chlorinated polyethylene, chlorosulfonated polyethylene, alkylated chlorosulfonated polyethylene, trans-polyoctenamer, polyacrylic rubber, and the like, and mixtures thereof.

The elastomer may be present in the water-based or solvent-based coating liquid in a concentration suitable to facilitate application of the coating to the tire surface and allow relatively rapid removal of the water or solvent carrier by drying or evaporation or the like. In one embodiment, the elastomer may be present in the water-based or solvent-based coating liquid in a range of about 10 to about 90 percent by weight.

The water-based or solvent-based coating liquid may comprise one or more cure agents as is required to obtain a cured coating on the camouflage tire. Such cure agents may include, but are not limited to, well-known classes of peroxides including diacyl peroxides, peroxyesters, dialkyl peroxides and peroxyketals. Specific examples include dicumyl peroxide, n-butyl-4,4-di(t-butylperoxy) valerate, 1,1-di(t-butylperoxy)-3,3,5-trimethylcyclohexane, 1,1-di(t-butylperoxy) cyclohexane, 1,1-di(t-amylperoxy) cyclohexane, ethyl-3,3-di(t-butylperoxy) butyrate, ethyl-3,3-di(t-amylperoxy) butyrate, 2,5-dimethyl-2,5-di(t-butylperoxy) hexane, t-butyl cumyl peroxide, a,á-bis(t-butylperoxy)diisopropylbenzene, di-t-butyl peroxide, 2,5-dimethyl-2,5-di(t-butylperoxy) hexyne-3, t-butyl perbenzoate, 4-methyl-4-t-butylperoxy-2-pentanone and mixtures thereof. Cure coagents may also be present. Such coagents include, but are not limited to, triallyl cyanurate, triallyl isocyanurate, triallyl phosphate, triallyl trimellitate, diallylidene pentaerithryte, diallyl terephthalate, tetraallyl oxyethane, triallyl citrate, acetyl triallyl oxyethane, acetyl triallyl citrate, di-, tri-, tetra- and penta-functional acrylates, di-, tri-, tetra- and penta-functional methacrylates, n,n'-m-phenylene-dimaleimide, 1,2-cis-polybutadiene and mixtures thereof. Cure agents may be added to the coating liquid in an amount suitable to facilitate crosslinking or otherwise cure of the elastomer as is appreciated by one of skill in the art without undue experimentation.

The water-based or solvent-based coating liquid may comprise one or more colorants as are desired to impart a given color or pattern to the camouflage tire. The color imparted by the colorants is not limited, and may include any color obtainable with known colorant additives. The colorants may include any suitable dyes, pigments, or the like that impart the desired color. The colorants may be included in the water or solvent-based coating liquid or mixed with the coating liquid immediately prior to application to the tire. The relative amount of colorant to be added to the coating liquid is dependent on the type of colorant, the desired color, and the desired intensity of the color, as would be appreciated by one of skill in the art without undue experimentation.

Dyes are generally defined as compounds which contain groups that confer color, generally called chromophores. More information on dyes in general is available in *The Chemistry of Synthetic Dyes,* Volumes I and II by K. Venkaktaraman, 1952, published by Academic Press, Inc., New York, and in *Organic Chemistry* by W. T. Caldwell, 1943, published by Houghton Mifflin Company in its chapter entitled "Synthetic Dyes," Pages 702 through 725.

The coating compositions of the present invention also may contain color pigments, including inorganic pigments, such as titanium dioxide, talc, mica, iron oxides, lead oxides, chromium oxides, lead chromate and carbon black, including conductive carbon black, and organic pigments such as phthalocyanine blue and phthalocyanine green, as well as a variety of other color pigments.

The water-based or solvent-based coating liquid is applied to one or more external surfaces of a tire by any of various application methods as are known in the art, including spraying, brushing, rolling, submersion, and dipping, wiping, and the like. In one embodiment, the water-based or solvent-based coating liquid is sprayed onto one or more external surfaces of the tire. The spray is applied manually or automatically using spray application devices as are known in the art.

To promote adhesion of the applied coating, the external surfaces of the tire may require preliminary preparation prior to application of the water-based or solvent-based coating. In one embodiment, the external tire surfaces may be cleaned of dirt, oils, and other contaminants using an aqueous detergent solution or other cleaning material. Mold release agents such as silicone mold release agents that may interfere with adhesion may be removed using solvents such as alcohols and the like. The external tire surfaces may further be prepared by application of a suitable primer material. In one embodiment, the external tire surface may be pretreated with a chlorinating agent such as sodium hypochlorite and hydrochloric acid, or with a cyanuric acid solution. One example of a chlorinating agent is commercially available under the tradename Chemlok® 7701. The primer may be applied to the surface of the elastomeric material by brushing, dipping, spraying, wiping, or the like, after which the primer is allowed to dry.

To further promote adhesion of the coating to the tire surface, the tire rubber may comprise particular agents that promote adhesion. One such approach is taught in U.S. Pat. No. 4,669,517, fully incorporated herein by reference, wherein it is disclosed to add at least one hydroxyl terminated diene polyol to the tire rubber compound to promote adhesion.

As a further way to promote adhesion, it may be desirable if making the camouflage tire to use a tire produced without the use of silicone type mold release agents. Such agents as are typically used in manufacture of tires may interfere with the adhesion of the elastomer coating.

After any preliminary surface preparation and priming, the water-based or solvent-based coating material may be applied to the one or more external tire surfaces by one of the aforementioned methods. In one embodiment, the coating material containing suitable colorant and curing agents is sprayed onto at least part of all entire external surfaces of the tire. The coating solution is applied in a manner sufficient to give a coating over part or all of the external surface of the tire, where the thickness of the coating when cured is suitable to prevent cracking, peeling, and sloughing from the tire surface. In one embodiment the coating thickness may be from about 0.1 to about 2 microns. In another embodiment, the coating thickness may be from about 0.25 to about 1 microns.

The coating solution may be applied in one or more layers as is needed. In one embodiment, a camouflage pattern having two or more colors may require sequential application of two or more layers of coating solution, with each layer having the same or different colorant to obtain the desired pattern. Each subsequent layer may be applied to part or all of the external tire surface, to obtain a plurality of color regions which in total comprise a desired camouflage pattern. Subsequent applications of the coating materials may require a slight time delay to allow for drying or partial cure of the previous layer.

In one embodiment, the camouflage tire may be a camouflage ATV tire suitable for use in a forest or mountainous region. The camouflage ATV tire suitable for use in a forest or mountainous region may comprise two or more colored regions on the surface of the tire, which may be applied by sequential spraying of layers of water-based or solvent-based coating liquids. The camouflage ATV tire may be preliminarily cleaned with a detergent solution to remove dirt and oils, alcohol to remove any silicone mold release agents, and all external surfaces primed with a suitable primer. A first layer may be applied as a continuous layer of black colored elastomer liquid to give a continuous layer of black over the bead, sidewalls, and tread. Next, one or more regions of color such as olive drab, yellow, or tan colored elastomer liquid may be sprayed over parts of the black layer to give a plurality of regions of color as is required to give the desired camouflage pattern. The plurality of color regions may overlap and may extend over one or more external surfaces. The color regions applied subsequent to the initial black layer may extend over at least a part of the external surface of the camouflage tire.

The water-based or solvent-based coating liquid may be applied to give camouflage tires having a camouflage pattern that meets military specifications. Alternatively, the camouflage pattern may be any pattern that is suitable to satisfy the aesthetic desires of the user, or to provide a camouflage tire having reduced visual perceptibility against the background of a given use environment.

In another embodiment, the camouflage tire may have a camouflage pattern comprising a single color to make the camouflage tire suitable for use in a relatively monochromatic environment. For example, camouflage tires suitable for use in a snowy or arctic environment may be white or a variation thereof over the entire external surface. Camouflage tires suitable for use in a desert or grassland environment may be tan, salmon, or pinkisk or some variation thereof over the entire external surface. Thus, the camouflage pattern on the camouflage tire may comprise one or more regions of color as is need for use in a particular environment.

For camouflage tires suitable for use in environment where a monochromatic tire is desirable, the tire rubber may be made using a non-black filler and without carbon black. Typically, black tires comprise a black filler such as the various carbon blacks as are known in the art. In the case of a camouflage tire having a white, tan, or otherwise monochromatic hue other than black, a non-black filler may be used. Such non-black fillers include the silicas, clays, and other non-black fillers as are known in the art.

EXAMPLE 1

In this example, several physical properties of an applied camouflage coating on an ATV were measured. Camouflage coating was applied to standard ATV type sidewall and tread compounds. The samples were tested for various properties to characterize the strength of the film as well as the ability of the film to resist environmental factors.

For the camouflage colors, the compound testing was run on ATV tread and sidewall compounds. Lab samples were cured and then coated using the green and brown coatings used on the camouflage tires. It is believed that the coating material was substantial the same as the EnduraLast tire coating available from Lord Corporation, with modification to include suitable colorants.

The initial camouflage coating showed a greater propensity of cracking in the kinetic ozone test and a lower fatigue resistance. All other physical properties were equivalent to the uncoated samples, including static ozone and cyclic dynamic ozone testing. The cracking on the kinetic ozone test was not seen on the passenger samples that were coated.

There was some discoloration of the samples noted after ozone testing.

Results of the physical properties testing is shown in Tables 1 and 2.

TABLE 1

| Sample | 1 | 2 | 3 | 4 |
|---|---|---|---|---|
| Sample type | Sidewall | Coated Sidewall | Tread | Coated Tread |
| UTS | | | | |
| 300% Modulus | 5.35 | 5.21 | 5.38 | 5.42 |
| Tensile | 11.44 | 13.46 | 16.42 | 13.89 |
| Elongation | 562 | 626 | 701 | 664 |
| #95 Monsanto | | | | |
| Cyclic Fatigue Cam 14 | 1554 | 56 | 1550 | 86 |
| Penetration Energy (J) | | | | |
| 0-5 mm | 0.076 | 0.079 | 0.083 | 0.085 |
| 0-20 mm | 2.645 | 2.645 | 2.756 | 2.793 |
| Bent Loop Ozone | Ok | Ok | Ok | Ok |
| Kinetic Ozone (60%) | Not broken | Broken | Not broken | Broken |
| Dynamic Cyclic Ozone (25%) | | | | |
| Days to break | 2 | 4 | 6 | 5 |
| Dynamic Cyclic Ozone (25%) Aged 3 days @ 90° C. in water | | | | |
| Days to break | 7 | 7 | 10 | 8 |

TABLE 2

Retest Monsanto Fatigue with modified coating and only coated on one side

| Sample | 1 | 2 | 3 | 4 |
|---|---|---|---|---|
| Sample type | Sidewall | Coated Sidewall #95 Monsanto | Tread | Coated Tread |
| Cyclic Fatigue Cam 14 | 1366 | 1041 | 1440 | 1175 |

EXAMPLE 2

In this example, ATV tires were painted in camouflage. Three front tires (AT25×8-12 Rawhide Grips) and three rear tires (AT25×10-12 Rawhide Grips) were coated. The tires were coated in a forest camouflage, consisting of green, brown and black and a desert camouflage consisting of tan, brown, and black. One rear and one front tire were only painted on the sidewall, whereas the other 4 tires had the entire tread and sidewall surface coated. Tires were cleaned, then coated with the black coating to give a consistent color. The other two colors were sprayed on to achieve the camouflage effect. The coating process was completely manual. It is believed that the coating material was substantial the same as the EnduraLast tire coating available from Lord Corporation, with modification to include suitable colorants.

Tires were run on an ATV endurance test in order to determine the durability of the coating. The tires were run 300 miles on an off road course and powerwashed at 25 mile intervals. Then the tires were run through a mud pit for 1 hour and powerwashed at 15-minute intervals. This test simulates about 1 season/1 year of use of fairly strenuous use by a customer.

First Test:

The coating was already wearing off the tread area after only 50 miles. The tires with only the sidewall coated looked better after wear. It was decided that only the sidewall would be coated for future tests, and we would not pursue coating the entire tread area. There was noted flaking and peeling of the coating on the sidewall. Upon inspection of the tested tires it was determined that the peeling was due to poor adhesion of the coating.

The front tires saw more scuffing of the coating than the rear tires. In general, the front tires will see more wear. However, the rear tires also had a scuff rib which may have helped protect the sidewall. It was decided in future tires, a front tire design with a scuff rib would be tested to determine if it would help protect the sidewall from scuffs.

Second Test:
    Front—cleaned, Tracker P with scuff rib
    cleaned, Rawhide Grip—no scuff rib
    Rear—cleaned, Rawhide Grip with scuff rib
    not cleaned but cured without pre-cure paint and mold release, Rawhide Grip w/scuff rib Coating was slightly modified from first test to be more flexible. Tires were cleaned with isopropyl alcohol before coating. The one tire that was not cleaned showed a considerable amount of peeling despite the fact that it did not have any pre-cure paint or mold release on it. This suggests that the waxes used as protectants in the sidewall compound which bloom to the surface may also contribute to the lack of adhesion of the coating if not cleaned immediately prior to the application. The cleaned tires showed no sign of flaking or peeling at the end of the test.

The scuff rib on the front tire did make a marked improvement in protecting the sidewall from scuffs.

After testing the coating was intact with only some scuffs. The scuffs were deemed acceptable without the peeling.

While present exemplary embodiments of this invention and methods of practicing the same have been illustrated and described, it will be recognized that this invention may be otherwise variously embodied and practiced within the scope of the following claims.

What is claimed is:

1. A method of applying a camouflage pattern to a tire, comprising steps of
sequentially applying two or more layers of liquid comprising at least one elastomer and a colorant, each layer being applied to all or part of an external tire surface, wherein the elastomeric coating comprises a fluoropolymer;
drying or curing said two or more layers to form an elastomeric coating on said external tire surface;
such that a plurality of colored elastomeric regions disposed on said external tire surface is obtained which comprises a camouflage pattern of at least two different colors.

2. The method of claim 1, further comprising a step of cleaning said external surface prior to applying said liquid comprising said at least one elastomer.

3. The method of claim 2, wherein said cleaning step comprises cleaning said external surface with an alcohol.

4. The method of claim 1, wherein each of said colored elastomeric regions is of thickness between about 0.1 and about 2 microns.

5. The method of claim 1, wherein said colorant is selected from the group consisting of dyes and pigments.

6. The method of claim 1, wherein said liquid further comprises curing agents.

7. The method of claim 1, wherein said at least one external surface is a sidewall surface.

8. The method of claim 1, wherein the coating comprises at least two distinct color regions in a forest, mountain region, or desert camouflage pattern, said at least two different colors selected from olive drab, brown, yellow, tan, and black.

9. The method of claim 1, further comprising a step of pretreating said external surface with a chlorinating agent prior to applying said liquid comprising said at least one elastomer.

* * * * *